United States Patent [19]

Morimoto

[11] Patent Number: 5,766,722
[45] Date of Patent: Jun. 16, 1998

[54] AUTOMOTIVE FLOOR COVERING

[75] Inventor: Hatsuro Morimoto, Tarui, Japan

[73] Assignee: Ikeda Bussan Co., Ltd., Ayase, Japan

[21] Appl. No.: 616,444

[22] Filed: Mar. 15, 1996

[30] Foreign Application Priority Data

Mar. 15, 1995 [JP] Japan .................. 7-084909

[51] Int. Cl.⁶ ........................................ B32B 3/02
[52] U.S. Cl. .................. 428/88; 428/62; 428/89; 428/95
[58] Field of Search ................. 428/88, 89, 62, 428/95

[56] References Cited

U.S. PATENT DOCUMENTS

| | | | |
|---|---|---|---|
| 1,998,781 | 4/1935 | Jackson | 428/89 |
| 2,790,225 | 4/1957 | Cogovan et al. | 428/88 |
| 3,184,367 | 5/1965 | White | 428/89 |
| 3,484,316 | 12/1969 | Dirrim | 428/89 |
| 3,806,401 | 4/1974 | Brinkhoff et al. | 428/88 |
| 4,108,351 | 8/1978 | Hough | 428/88 |
| 4,347,273 | 8/1982 | Dale | 428/89 |
| 4,355,063 | 10/1982 | Palmer et al. | 428/89 |
| 4,379,189 | 4/1983 | Platt | 428/89 |
| 4,548,850 | 10/1985 | Stauder et al. | 428/88 |
| 4,654,246 | 3/1987 | Provost et al. | 428/88 |
| 4,659,602 | 4/1987 | Birch | 428/89 |
| 4,820,566 | 4/1989 | Heine et al. | 428/89 |
| 4,828,898 | 5/1989 | Bailey | 428/88 |
| 4,835,030 | 5/1989 | Squier et al. | 428/88 |
| 4,849,271 | 7/1989 | Weihrauch | 428/89 |
| 4,871,602 | 10/1989 | Luker | 428/88 |
| 5,055,333 | 10/1991 | Heine et al. | 428/89 |
| 5,109,784 | 5/1992 | Lepe-Cisneros | 428/88 |
| 5,324,562 | 6/1994 | Mullinax et al. | 428/88 |
| 5,474,829 | 12/1995 | Woosley | 428/88 |
| 5,529,825 | 6/1996 | Sutherland | 428/88 |

FOREIGN PATENT DOCUMENTS

| | | | |
|---|---|---|---|
| 0 514 191 | 11/1992 | European Pat. Off. | 428/89 |
| 2582210 | 11/1986 | France . | |
| 51-19509 | 6/1976 | Japan | 428/88 |

OTHER PUBLICATIONS

Translation of Behar et al., FR 2.582.210, Oct. 1996.

*Primary Examiner*—Terrel Morris
*Attorney, Agent, or Firm*—Foley & Lardner

[57] ABSTRACT

A floor covering for automotive vehicles includes a first surface area layer formed of tuft carpeting or other high quality, esthetically pleasing floor covering material and a second surface area layer formed of needlepunch floor covering or other durable and less costly material. The first and second surface layer portions are provided on a support mounted over a waterproof bottom surface sheet of polyethylene, or the like. One or both of the tuft carpet and needlepunch areas may be adhered to the support via a hot melt film layer. The densities of the materials selected for the layers are determined for durability and strength and may additionally absorb vehicle vibration and provide reduced noise in the vehicle cabin. To this effect, an additional base layer may be provided between the bottom surface layer and the hot melt layer which is formed of high density material for increasing passenger comfort and overall durability of the floor covering material.

9 Claims, 3 Drawing Sheets

AUTOMOTIVE FLOOR COVERING

BACKGROUND OF THE INVENTION

1. Field of the Invention

The present invention relates to a floor covering for a passenger cabin of an automotive vehicle.

2. Description of the Related Art

Generally, automotive vehicle manufactures provide some type of floor covering in a passenger cabin of an automotive vehicle for increased comfort of the vehicle users. It is desirable to provide a so-called tuft carpet or other such padded floor covering. FIGS. 5 and 6 show cross sectional and perspective diagrams of such a conventional automotive floor covering. As may be seen, the floor covering 1 includes a tuft carpet 2 which is provided over a base layer 3 and integrated as a single unit for ease of installation.

However, such carpeting is expensive and increases an overall price of the vehicle. It is also known to provide a so-called needlepunch floor covering, which provides protection to a vehicle floor and a degree of padding for occupants feet while also being economical in terms of price. However, this type of floor covering does not provide the degree of comfort and esthetic appearance as the above-mentioned tuft carpeting.

Of course, it is possible to install two types of floor covering in a vehicular passenger cabin, but this increases costs for installation and creates an increased number of parts to be installed. Further, if two different types of floor covering are provided, it is difficult to assure the positional stability of both such that they will remain disposed accurately over a predetermined portion of the vehicle floor.

For providing a high level of passenger comfort, it is desired to provide a vehicular floor covering which provides sufficient passenger comfort and esthetic appearance and which is low in cost and simple to install, and which assuredly maintains an installed position thereof according to normal use.

SUMMARY OF THE INVENTION

Thus, it is an object of the present invention to overcome the drawbacks of the related art.

It is a further object of the invention to provide a vehicular floor covering combining passenger comfort and esthetic appearance which is low in cost and simple to install.

It is also an object of the present invention to provide an automotive floor covering which assuredly maintains an installed position thereof according to normal use.

According to one aspect of the invention, there is provided a floor covering for installation within an automotive vehicle cabin, comprising: a support having first and second predetermined area portions; and a surface layer, the surface layer including a first surface area layer having first surface characteristics provided over the first predetermined area portion of the support and a second surface layer portion having second surface characteristics provided over the second predetermined area portion of the support.

DETAILED DESCRIPTION OF THE PREFERRED EMBODIMENTS

Hereinbelow, a preferred embodiment of the invention will be explained in detail with reference to the drawings.

Figure 1:
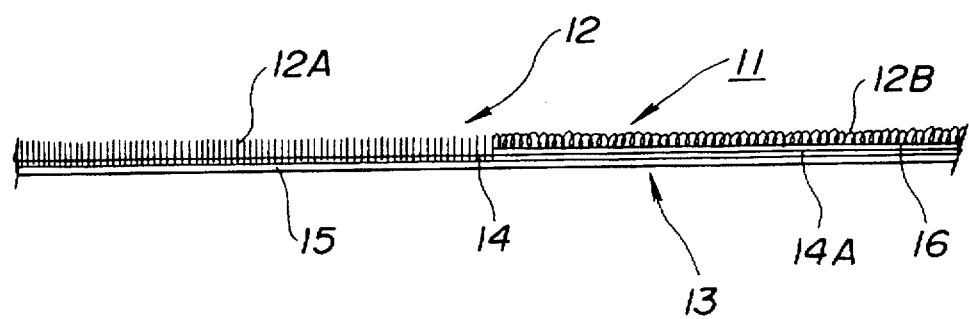
FIG. 1 shows a cross-sectional view of a first embodiment of an automotive floor covering according to the invention.
Figure 2:
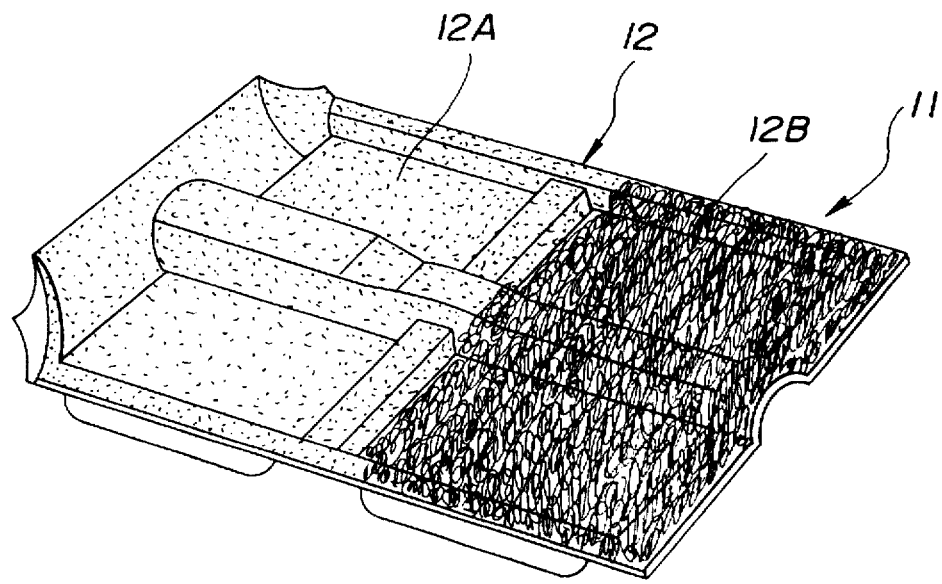
FIG. 2 is a perspective view of the automotive floor covering of FIG. 1.

Referring to FIGS. 1 and 2, a cross-sectional view of the structure of an automotive floor covering 11 according to a first embodiment is shown. As may be seen in the drawing, the floor covering 11 includes a surface layer 12, comprised of a first surface layer portion 12A and a second surface layer portion 12B and a support 13. The support is divided into a first predetermined area portion over which the the first surface layer portion 12A is provided and a second predetermined area portion over which the second surface layer portion 12B is provided. The first surface layer portion 12A has first surface characteristics selected to be of a high quality, esthetically pleasing material and the second support layer portion has second surface characteristics selected to be of a less expensive durable material. Further the floor covering 11 includes a support 13 having a base layer 14 to which the first and second surface layer portions 12A, 12B are fixed and a bottom surface 15 provided on the opposite side of the base layer 14.

The first surface layer portion 12A is formed of tuft carpet fixed to the base layer 14 and the second surface layer portion 12B is formed of needlepunch carpet attached to an extended base layer portion 14A of the base layer 14. The needlepunch carpet is adhered to the extended base layer portion 14A via an adhesion layer 16 in the form of a hot melt film. This hot melt film is to provide adhesion between the needlepunch carpet and the extended base layer portion 14A during hot forming of the automotive floor covering into the shape shown in FIG. 2.

According to the first embodiment the second area portion 12B is formed of needlepunch carpet type floor covering, although molded rubber floor covering or some alternative type of durable, substantially lower cost floor covering material may also be preferably utilized. Further, tuft carpet or other such high quality padded floor covering having durability combined with high esthetic appearance is utilized for the first area portion 12A. The first area portion 12A is arranged to cover portions of the vehicle floor in which passenger's feet are to be placed.

It will be noted that according to the present embodiment the bottom surface layer 15 is formed as a sheet of polyethylene.

The sheet of polyethylene forming the bottom surface layer 15 may have a density of between 250–500 g/m$^2$ inclusive, while the hot melt film of the adhesion layer 16 is selected with a density of between 30–60 g/m$^2$ inclusive. The first surface surface layer portion 12A comprising the tuft carpet area and/or the base layer 14 may have a density of between 100–150 g/m$^2$ inclusive and the second surface surface layer portion 12B comprising the needlepunch floor covering surface layer portion has a density of between 200–500 g/m$^2$ inclusive.

Figure 3:
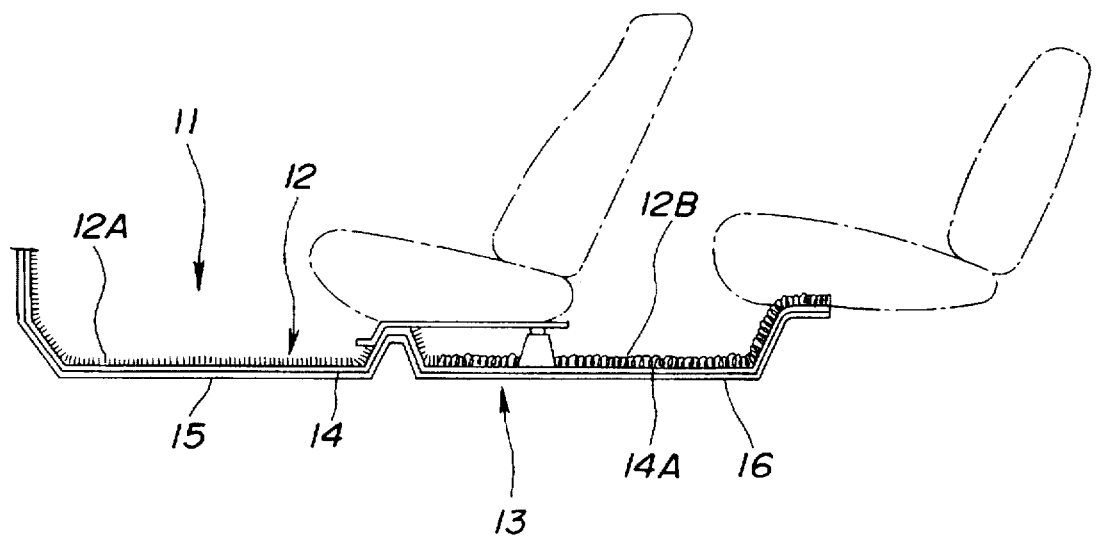
FIG. 3 shows the automotive floor covering according to the first embodiment in an installed position thereof within a vehicle cabin.

FIG. 3 shows one embodiment of a layout of the floor covering according to the invention, as may be seen the tuft carpeting 12A is provided in a passenger area for comfort and pleasing appearance while a rear seat area is provided with the needlepunch floor covering 12B for durability and reduced expense. However, various alternative arrangements are possible according to the invention. For example, the tuft carpeting 12A may be provided in all areas of the vehicle cabin which are visible while the inexpensive needlepunch floor covering 12B is provided in areas such as under seats etc.

Hereinbelow a second preferred embodiment of an automotive floor covering according to the invention will be described in detail with reference to FIG. 4.

Figure 4:
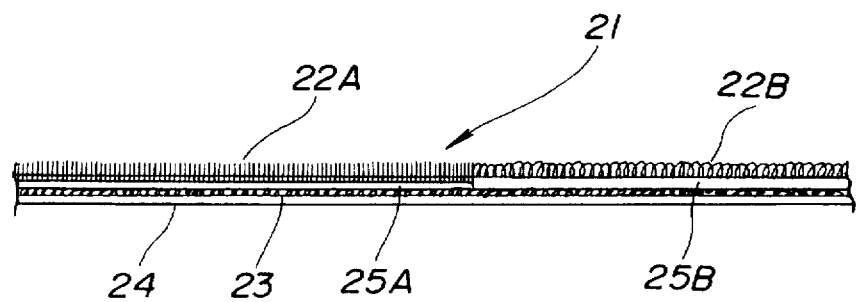
FIG. 4 is a cross-sectional view of a second embodiment of an automotive floor covering according to the invention.
Figure 5:
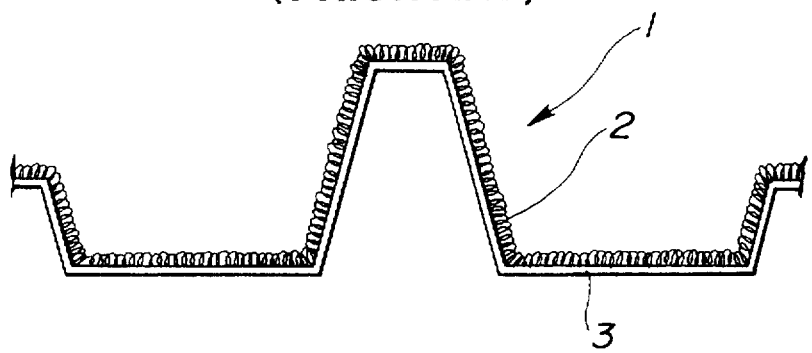
FIG. 5 is a cross-sectional view of a conventional automotive floor covering.
Figure 6:
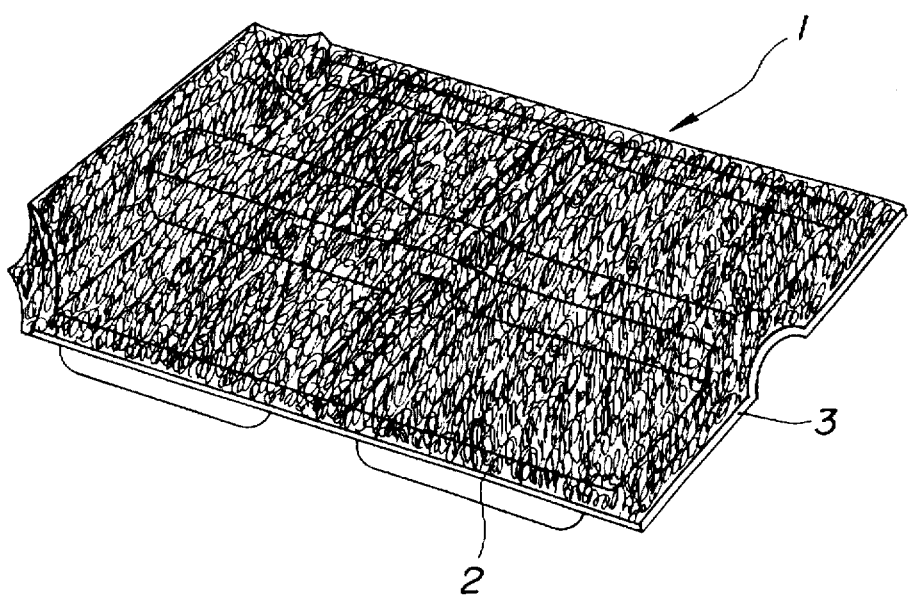
FIG. 6 is a perspective view of the conventional floor covering of FIG. 5.

As may be seen the embodiment of FIG. 4 shows an automotive floor covering according to the invention having increased thickness. According to this, passenger comfort, durability, esthetic appearance and vibration absorption are all enhanced. Referring to FIG. 4, a cross-sectional view of the structure of an automotive floor covering 21 according to the second embodiment is shown. As may be seen in the drawing, the floor covering 21 includes a surface layer comprised of a first surface layer portion 22A and a second surface layer portion 22B. Further the floor covering 21 includes a support portion comprised of a bottom layer 24, and a base layer 23. Disposed atop the base layer 23 over the entire area of the automotive floor covering, a hot melt film layer is provided including a first area portion 25A and a second area portion 25B.

According to the second embodiment the second surface layer portion 22B is formed of needlepunch carpet type floor covering, although molded rubber floor covering or some alternative type of durable, substantially lower cost floor covering material may also be preferably utilized. Further, tuft carpet or other such high quality padded floor covering having durability combined with high esthetic appearance is utilized for the first surface layer portion 22A.

In this embodiment the base layer 23 is in the form of a single layer of a sheet of unwoven fabric having a density of between 20 g/m$^2$ and 26 g/m$^2$ inclusive, a sheet of high-density felt material having a density of between 300 g/m$^2$ and 700 g/m$^2$ inclusive. If desired, the base layer 23 is in the form of lamination of a plurality of the above-mentioned layers.

Further, the base layer 23 is covered with a hot melt layer 25 including first and second surface layer portions 25A and 25B. According to this, manufacture of the floor covering according to the invention is simplified since both the tuft carpet forming the first surface layer portion 22A and the needlepunch floor covering portion of the second surface area 22B may be adhered together in a single processing step.

The relative densities of the floor covering layer are selected for durability while the additional advantage of providing vibration absorption is also available.

The automotive floor covering may be laid out according to the arrangement explained in connection with FIG. 3 of any of the options discussed hereinabove. For example, the tuft carpeting portion may be provided in all areas of the vehicle cabin which are visible to the vehicle occupants, while the inexpensive molded floor covering of the second surface area 22B is provided in areas such as under seats etc. Or, it is possible to provide the tuft carpet of the first surface layer portion 22A everywhere except just an area determined for receiving the soles of vehicle occupant's feet. Thus the occupant feet are received by the second surface layer portion 22B while surrounding areas are trimmed with the esthetically pleasing first surface layer portion 22A.

Thus, there is provided an automotive floor covering which is simple and structure and which utilizes a reduced amount of expensive materials while providing a high degree of passenger comfort. Further, according to the invention a floor covering material is provided capable of absorbing vehicular vibration and reducing noise levels in a vehicle cabin.

Further, a substantially inexpensive floor covering having pleasing esthetic appearance and substantial ease of installation is provided.

It will be noted that, although the preferred embodiment is set forth in terms of an automotive floor covering, the present invention may be embodied in various different ways without departing from the principle of the invention as herein set forth.

The present invention in not limited only to the description as herein disclosed but may be modified and embodied in other ways without departing from the scope or inventive concept of the invention as set forth above.

What is claimed is:

1. A floor covering for installation within an automotive vehicle cabin, comprising:

a support having first and second predetermined area portions: and a surface layer including a first surface layer portion provided over said first predetermined area and a second surface layer portion provided over said second predetermined area, said first surface layer portion being formed of tuft carpet and said second surface layer portion being formed of needlepunch carpet or molded rubber, wherein said support includes a base layer to which said first and second surface layer portions of said surface layer are attached, and a bottom surface of water-proof material which opposes said base layer, wherein at least one of said first and second surface layer portions is bonded to said base layer by means of a hot melt adhesive material, wherein said tuft carpet forming said first surface layer portion is attached to a first area portion of said base layer, and, wherein said second surface layer portion comprises needlepunch carpet, said floor covering further including an adhesion layer disposed between said needlepunch carpet forming said second surface layer portion and said base layer.

2. A floor covering as set forth in claim 1, wherein said adhesion layer is formed as a hot melt film layer.

3. A floor covering for installation within an automotive vehicle cabin, comprising:

a support having first and second predetermined area portions: and a surface layer including a first surface layer portion provided over said first predetermined area and a second surface layer portion provided over said second predetermined area, said first surface layer portion being formed of tuft carpet and said second surface layer portion being formed of needlepunch carpet or molded rubber, wherein said support includes a base layer to which said first and second surface layer portions of said surface layer are attached, and a bottom surface of water-proof material which opposes said base layer, wherein at least one of said first and second surface layer portions is bonded to said base layer by means of a hot melt adhesive material, wherein said second surface layer portion comprises needlepunch carpet, said floor covering further including an adhesion layer having a first portion thereof disposed between said tuft carpet and said base layer, and a second portion disposed between said needlepunch carpet and said base layer.

4. A floor covering as set forth in claim 3, wherein said adhesion layer is formed as a hot melt film layer.

5. A floor covering as set forth in claim 4, wherein said water-proof material is polyethylene having a density of between 250–500 g/m², said hot melt film has a density of between 30–60 g/m², said base layer has a density of between 100–150 g/m² and said needlepunch carpet has a density of between 300–500 g/m².

6. A floor covering as set forth in claim 4, wherein said base layer comprises unwoven fabric cloth having a density of 20–26 g/m².

7. A floor covering as set forth in claim 4, wherein said base layer comprises a high density felt material having a density of 200–700 g/m².

8. A floor covering for installation within an automotive vehicle cabin, comprising:

- a support having first and second predetermined area portions; and
- a surface layer including a first surface layer portion provided over said first predetermined area and a second surface layer portion provided over said second predetermined area, said first surface layer portion being formed of tuft carpet and said second surface layer portion being formed of needlepunch carpet or molded rubber, wherein said support includes a base layer to which said first and second surface layer portions of said surface layer are attached, and a bottom surface of water-proof material which opposes said base layer, wherein at least one of said first and second surface layer portions is bonded to said base layer by means of a hot melt adhesive material, wherein said base layer comprises a lamination of unwoven fabric and felt.

9. A floor covering for installation within an automotive vehicle cabin, comprising:

- a support having first and second predetermined area portions; and
- a surface layer including a first surface layer portion provided over said first predetermined area and a second surface layer portion provided over said second predetermined area, said first surface layer portion being formed of tuft carpet and said second surface layer portion being formed of needlepunch carpet, wherein said support includes a base layer to which said first and second surface layer portions of said surface layer are attached, and a bottom surface of polyethylene which opposes said base layer, said base layer being formed of unwoven fabric, wherein each of said first and second surface layer portions is bonded to said base layer by means of a hot melt adhesive material.

* * * * *